(12) United States Patent
Backmann et al.

(10) Patent No.: US 10,625,458 B2
(45) Date of Patent: Apr. 21, 2020

(54) OVERTURNING DEVICE FOR OVERTURNING MOLTEN MATERIAL AND RINSING METHOD

(71) Applicant: WINDMOLLER & HOLSCHER KG, Lengerich (DE)

(72) Inventors: Martin Backmann, Lengerich (DE); Hermann-Josef Jäckering, Emsbüren (DE); Markus Bussmann, Essen (DE); Bernd Liesbrock, Lengerich (DE); Karsten Golubski, Haltern am See (DE)

(73) Assignee: WINDMÖLLER & HÖLSCHER KG, Lengerich (DE)

(*) Notice: Subject to any disclaimer, the term of this patent is extended or adjusted under 35 U.S.C. 154(b) by 362 days.

(21) Appl. No.: 15/508,414

(22) PCT Filed: Sep. 2, 2015

(86) PCT No.: PCT/EP2015/070070
§ 371 (c)(1),
(2) Date: Mar. 2, 2017

(87) PCT Pub. No.: WO2016/034636
PCT Pub. Date: Mar. 10, 2016

(65) Prior Publication Data
US 2017/0282432 A1 Oct. 5, 2017

(30) Foreign Application Priority Data
Sep. 3, 2014 (DE) .................. 10 2014 112 713

(51) Int. Cl.
| B29C 48/27 | (2019.01) |
| B29C 48/04 | (2019.01) |
| B29C 48/30 | (2019.01) |
| B29C 48/32 | (2019.01) |
| B29C 48/36 | (2019.01) |
| B29C 48/70 | (2019.01) |
| B29C 48/25 | (2019.01) |

(Continued)

(52) U.S. Cl.
CPC .............. *B29C 48/27* (2019.02); *B29C 48/04* (2019.02); *B29C 48/10* (2019.02); *B29C 48/256* (2019.02);
(Continued)

(58) Field of Classification Search
CPC ....... B29C 48/27; B29C 48/256; B29C 48/10; B29C 48/2528; B29C 48/277;
(Continued)

(56) References Cited

U.S. PATENT DOCUMENTS

| 3,911,073 A | 10/1975 | Charles-Massance |
| 2011/0001267 A1 | 1/2011 | Demin et al. |

FOREIGN PATENT DOCUMENTS

| CH | 512989 A | 9/1971 |
| CN | 101691061 B | 4/2010 |

(Continued)

OTHER PUBLICATIONS

German Office Action, German Application No. 102014112713.7, dated Mar. 27, 2015, 11 pages.
(Continued)

*Primary Examiner* — Christina A Johnson
*Assistant Examiner* — Xue H Liu
(74) *Attorney, Agent, or Firm* — Fenwick & West LLP

(57) ABSTRACT

The present invention relates to an overturning device (10) for overturning a molten material (200) in a melt channel (110) comprising a melt inlet (20) and a melt outlet (30), wherein between the melt inlet (20) and the melt outlet (30) at least a melt guidance means (40) is assembled for a rearrangement of molten material (200) from the centre (22) of the melt inlet (20) to the edge (34) of the melt outlet (30) and for a rearrangement of molten material (200) from the edge (24) of the melt inlet (20) into the centre (32) of the melt outlet (30).

8 Claims, 7 Drawing Sheets

Figure 1:
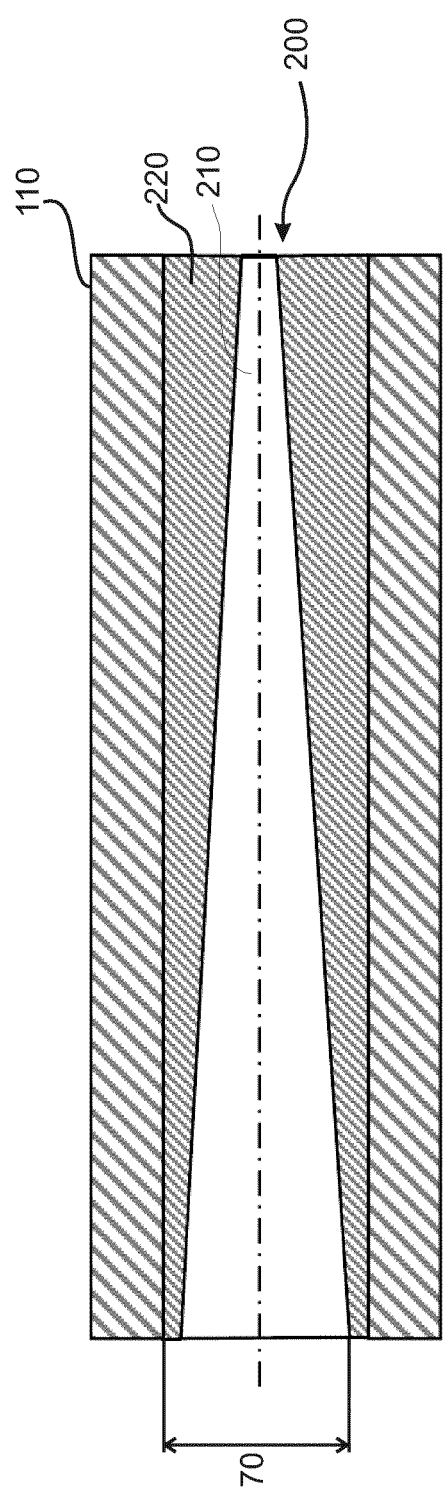

(51) Int. Cl.
*B29C 48/10* (2019.01)
*B29C 48/275* (2019.01)
*B29B 7/80* (2006.01)

(52) U.S. Cl.
CPC ...... *B29C 48/2528* (2019.02); *B29C 48/2692* (2019.02); *B29C 48/277* (2019.02); *B29C 48/30* (2019.02); *B29C 48/32* (2019.02); *B29C 48/362* (2019.02); *B29C 48/705* (2019.02); *B29B 7/802* (2013.01); *Y02P 70/263* (2015.11)

(58) Field of Classification Search
CPC ... B29C 48/2692; B29C 48/30; B29C 48/362; B29C 48/04; B29C 48/32; B29C 48/705
USPC .......................................................... 264/327
See application file for complete search history.

(56) References Cited

FOREIGN PATENT DOCUMENTS

| | | |
|---|---|---|
| DE | 67 52197 U | 5/1968 |
| DE | 19 56 459 A | 5/1971 |
| DE | 20 06 941 A | 8/1971 |
| DE | 21 29 971 B | 5/1972 |
| DE | 24 28 321 A1 | 1/1976 |
| EP | 0887172 A1 | 12/1998 |
| JP | S5869415 U | 5/1983 |
| JP | 2011-235546 A | 11/2011 |

OTHER PUBLICATIONS

PCT International Search Report and Written Opinion, PCT Application No. PCT/EP2015/070070, dated Mar. 31, 2016, 21 pages (with English translation of International Search Report).

PCT Written Opinion of the International Preliminary Examining Authority, PCT Application No. PCT/EP2015/070070, dated Jul. 25, 2016, 10 pages.

PCT International Preliminary Report on Patentability, PCT Application No. PCT/EP2015/070070, dated Mar. 9, 2017, 20 pages.

European Patent Office, Office Action, EP Patent Application No. 15760432.3, dated May 13, 2019, six pages (with English Summary of Office Action).

OVERTURNING DEVICE FOR OVERTURNING MOLTEN MATERIAL AND RINSING METHOD

The present invention relates to an overturning device for overturning a molten material in a melt channel, a blow head for performing a blow head extrusion method and a method for performing a purge process in an extrusion device.

It is known that extrusion devices are used in order to produce a plastic melt. This plastic melt can be continued to use in different manners. Thus, it is for example possible to introduce the molten material into a cavity of an injection moulding device in order to generate the corresponding components by injection moulding. Likewise, it is known that the molten material is provided for a so called blow extrusion method with which a blow film is extruded. In all cases it is necessary that at the end of the extruder the liquefied molten material is transported via corresponding melt channels to the respective place of use. These channels can be arbitrarily complex and particularly divide into single channels.

It is a disadvantage with known solutions of the extrusion device that these involve a high effort for the change of material. Thus, a so called purge process has to be performed in case the change of material from a first molten material to a second molten material should occur. In case for example a blow film extrusion device produces a product with a blue film colour for a certain time and subsequently a change to a transparent film colour is desired, initially the blue film colour and the corresponding molten material has to be purged from the single melt channels. Herefore, the extrusion device is already operated with the subsequent material until the greatest part of the old material of the molten material is purged out.

Since with melt channels in the edge area of these melt channels the transport velocity is mainly equalling zero, the old molten material so to say sticks, the purge process is very time consuming. With blow extrusion devices with a through-put of up to approximately 120 kg molten material per hour thereby a purge process can normally take up to 20 minutes until 1.5 hours. For each film layer for which a change of material should occur this leads accordingly to 120 kg or more waste material of the molten material. With multiple film layers the amount is multiplied with the amount of film layers, even when only one single film layer is purged. Thereby, rejection rates of up to 1000 kg can be reached. Simultaneously, the purge time comprises a dead time in which no useable production can occur. Accordingly, the known extrusion device with the corresponding purge method comprises significantly recognizable disadvantages concerning the time effort and concerning the resulting costs and the waste material.

It is object of the present invention to at least partially avoid the previously described disadvantages. Particularly, it is object of the present invention to reduce the time for the purge process in a cost efficient and simple manner.

Previous object is solved by an overturning device with the features of claims. Further features and details of the invention result from the dependent claims, the description and the drawings. Thereby, features and details which are described in connection with the overturning device according to the invention naturally also apply in connection with the blow head according to the invention and the method according to the invention and vice versa such that according to the disclosure of the single aspects of the invention it can always be reciprocally related to.

An overturning device according to the invention serves for overturning a molten material in a melt channel. Herefore, the overturning device comprises a melt inlet and a melt outlet, wherein between the melt inlet and the melt outlet at least one melt guidance means is assembled. The melt guidance means serves for a rearrangement of the molten material from the centre of the melt inlet to the edge of the melt outlet. Further, the melt guidance means is configured for a rearrangement of the molten material from the edge of the melt inlet into the centre of the melt outlet.

By the centre of the melt channel thereby basically each area has to be understood which is spaced apart from the edge. Particularly, a rearrangement occurs away from the edge. For example, the centre of the melt outlet can be the whole melt outlet area with a distance of approximately 5 mm to the edge.

By an overturning device according to the invention, thus, a rearrangement of the molten material in the melt channel occurs automatically without moveable parts by an active guidance with the help of the melt guidance means. The overturning device can be inserted into the melt channel or can configure a part of the melt channel. Via the melt inlet a fluid communicating connection with the melt channel is established such that the molten material can flow via the melt inlet into the overturning device. Subsequently of passing the melt inlet the molten material is rearranged via the melt guidance means in the manner according to the invention. At the melt outlet the rearranged molten material can exit the overturning device and further flow in the melt channel via the fluid communicating connection.

According to the invention the melt guidance means are configured for rearranging the molten material. Thereby, two basic layer functionalities are provided. At the melt inlet the molten material from the centre is used and is guided to the edge of the melt outlet. Simultaneously and via the same length a rearrangement of the molten material from the edge of the melt inlet occurs into the centre of the melt outlet. Therewith, the material from the centre at the melt inlet is rearranged with the material at the edge of the melt outlet such that at the melt outlet a completely rearranged melt layer situation occurs.

An overturning device according to the invention now significantly reduces the purge time with the use of an extrusion device. Thus, in a purge situation in the extrusion device it has to be concluded that the old molten material remains longer in the area of the edge of the melt channel than in the centre. Thus, during the purge process the centre of the melt channel is filled relatively fast with completely fresh and therewith new molten material, while at the edge still a high amount of old molten material remains. By the use of the overturning device according to the invention now a rearrangement of this old molten material occurs from the edge of the melt channel into the centre of the melt channel and therewith in the area of the fast or increased flow through quote. This leads to the fact that so to say old molten material in front of the overturning device is rearranged into the centre of the melt channel after the overturning device such that now it can be faster transported away in the centre. Thereby, that this overturning occurs in a manner according to the invention a significant reduction of the purge time can be achieved by a faster output of the old material from the melt channel.

Particularly, by an overturning device according to the invention a reduction of up to 50% of the whole purge time can be achieved. A further advantage is the reduction of the retention time at the edge even during the normal operation.

In this manner the thermal impact to the material can be reduced wherein material impairment can be reduced or even avoided.

The overturning device can thereby be inserted into a melt channel or can configure the melt channel. Naturally, in a melt channel two or more overturning devices can be provided with a defined distance. It is preferred like subsequently described in detail when the overturning device related to the length of the melt channel is assembled mainly in the middle.

The melt guidance with the help of the melt guidance means can thereby be configured in different manners. Thus, the subsequently described functions in a division can be provided by the melt guidance means like this is possible by the active guidance channels within the melt channel. These two different overturning functionalities are subsequently described in detail.

Thus, it can be an advantage when with the overturning device according to the invention the at least one melt guidance means comprises a first guidance channel with a guidance opening in the centre of the melt inlet and at least one guidance outlet at the edge of the melt outlet. Here, an active overturning within a single melt channel occurs such that an installation of a separate overturning device in an existing geometry of the melt channel is possible. By receiving in the guidance opening now the new or fresh material of the molten material is guided to the edge and is put out via the guidance outlet at the melt outlet. There it replaces the existing old material in the centre such that by a passive shifting here a complete rearrangement is achieved. Naturally, however also a movement of the old material from the edge into the centre can occur actively like this is subsequently described in detail by the second guidance channel in the subsequent paragraph. Via a guidance channel a completely closed channel can be understood. However, also partly laterally open guidance channels in form of so called slides or ramps can be understood in the sense of the present invention as a guidance channel. Accordingly, here the guidance opening and the guidance outlet comprise a completely outlined geometry or are equipped with a lateral opening, respectively.

It can be a further advantage when with the overturning device according to the previous paragraph the at least one melt guidance means comprises a second guidance channel with a guidance outlet in the centre of the melt outlet and at least one guidance opening at the edge of the melt inlet. Thereby, the second guidance channel so to say serves for the inverse functionality like the first guidance channel. Via the guidance opening molten material and therewith old molten material of the molten material can be received from the edge of the melt inlet and actively guided with the second guidance channel into the centre via the guidance outlet at the melt outlet. Thereby, not only by replacing but by active guiding and rearrangement the corresponding rearrangement according to the invention is possible from the edge to the centre and from the centre to the edge. The combination of two guidance channels is thereby preferably provided parallel such that the guidance opening of the first guidance channel and the guidance opening of the second guidance channel are assembled at the same or mainly the same position of the overturning device in flow direction. Simultaneously, it is an advantage when with the guidance outlet of the first guidance channel and the guidance outlet of the second guidance channel in relation to the flow direction are arranged at the same or mainly the same position at the melt outlet. Likewise it is an advantage when all guidance channels of the at least one melt guidance means comprise the same or mainly the same free flow area in order to be able to ensure a clean rearrangement, particularly with defined volume flows. Thereby, the single flow cross sections are preferably configured in order to provide the same or mainly the same flow velocities. Thereby, an undesired rupture of the single layers from one another is avoided with a high probability and therewith with a high safety.

It is further an advantage when with the overturning device according to the invention the at least one melt guidance means comprises a separation section with a first separation channel and a second separation channel. Thereby, in front of the separation section a division section for dividing the molten material into separation channels and after the separation section a combination section for merging the molten material from the separation channels is assembled. This configuration of a melt guidance means is naturally basically combinable with the melt guidance means of both previous paragraphs. By these separation functions likewise a rearrangement can occur. Thus, via the division section the amount of molten material is separated to two separation channels. This naturally also applies for the edge layers of the molten material such that in both separation channels only a part of the edge, namely particularly half of the edge, is equipped with the old material, while in the area of the division section the other half of the edge is already equipped with fresh material. In case the combination section for merging the molten material from the separation channels is geometrically adjusted in a corresponding manner, this leads to the fact that at least a part of the edge layer remains with new material with the combination of the partial flows of the molten material. Therewith, by the functionality of the division and the combination likewise a possibility of a rearrangement according to the invention can be ensured. Particularly, such a partly occurred rearrangement with the corresponding separation section is combined with guidance channels like it is described in the previous paragraphs.

An overturning device according to the previous paragraph can be further improved in that the combination section is configured for a central merging of the edge sections of the molten material. Thereby, it has to be understood that an explicit geometric adjustment of the single separation channels in the combination section is present. In case after the division section the edge sections with old molten material are located at the outer side of the respective separation channel, thus the two separation channels can be merged in a combination section such that the two edge sections of the molten material are centrally merged with the separation channels with old material. Therewith, a recombination of the partial flows of the molten material occurs by a complete or mainly complete rearrangement such that now by a clever recombination of the partial flows the edge layer is rearranged in front of the melt inlet into the centre of the melt outlet. Simultaneously, new material from the centre of the melt outlet is rearranged into the edge layers and therewith to the edge of the melt outlet. Therewith, preferably the respective diameter of the separation sections is adjusted to the diameter in front of the division section and after the combination section.

A further advantage can be achieved when with the overturning device according to the invention a shifting device is provided for a shifting of an overturning device between a first position and a second position. In the first position the melt inlet and the melt outlet are in a fluid communicating connection with the melt channel. In the second position the melt inlet and the melt outlet are separated from the melt channel. Therewith, the shifting device can for example perform a movement of the overturning device in a translatory, rotatory or in a combined manner. Particularly, thereby for the overturning device in the second position a pipe piece or a channel piece is provided which connects both remaining end sections of the melt channel in a fluid communicating manner. The shifting device allows that the rearrangement function so to say is switched on by pushing in the overturning device and is switched off by pushing out the overturning device. Since the overturning device generates a corresponding pressure loss situation by its overturning functionality it is an advantage when in the normal operation this overturning function is switched off. Therewith, an increased pressure loss is only generated during the purge process in order to ensure a corresponding rearrangement function. The increased pressure loss of the overturning device is switched off by pushing out the overturning device in the second position in the normal operation and accordingly can not further disturb.

It can further be an advantage when with the overturning device according to the invention the shifting device comprises a melt channel piece with a length which corresponds or mainly corresponds to the distance between the melt inlet and the melt outlet. A melt channel piece can during shifting from the first position into the second position be pushed to the position at which previously the overturning device was assembled. In other words the melt channel piece replaces the overturning device in the remaining melt channel and is thereby completed. This allows providing for the normal operation a mainly continuously proceeding melt channel. For the purge situation now the melt channel piece is removed from the fluid communicating position in the melt channel via the shifting device and is pushed to this position of the overturning device. This can occur manually and also mechanically via the subsequently described drive device. The advantage of this embodiment is the combination of the single shifting device. Particularly, thereby the melt channel piece and also the overturning device and therewith the melt inlet and the melt outlet are equipped with parallel or mainly parallel channel axes.

It can be a further advantage when with an overturning device according to the invention the shifting device comprises a guidance section for guiding of the shifting movement between the first position and the second position. Thereby, a slotted guide or a contracted slide area can be understood. Also other solutions are possible from technical view of the guidance section. By the guidance section or by a plurality of guidance sections the movement direction and the movement part for the shifting device and therewith for the overturning device is determined. Naturally, the guidance section can comprise corresponding stops in order to exactly define the end position for the first position and the second position. A guidance section can thereby provide particularly a linear or mainly linear shifting movement concerning the movement direction. However, basically also curved translational movements or even rotational movements are possible within the sense of the present invention.

It is further an advantage when with an overturning device according to the invention the shifting device is configured for shifting of the overturning device between the first position and the second position along the translational path, particularly along a straight line. A translation is particularly concerning the embodiment of a guidance functionality particularly configurable in a simple, compact and cost efficient manner. The translation particularly along a straight line ensures further a particularly short shifting path and therewith a fast switching between the rearrangement function and the normal operation situation. For the shifting movement in the shifting device a drive device is provided such that a movement along a translational path, particularly along a straight line, can occur without in-between operation of a gear. Particularly, with such a drive device it is a linear drive which is useable particularly cost efficiently and space saving and simply.

It can be a further advantage when with an overturning device according to the invention the shifting device comprises a drive device particularly in form of an electric motor for performing the shifting between the first position and the second position. Thereby, this is particularly about a reversible shifting possibility such that the shifting process can be performed mainly freely in both directions between both positions. The drive device is thereby particularly configured as linear drive in order to be able to provide a translational path, particularly along a straight line for the shifting device. The control of this drive device is preferably connected with the control of the blow head in order to provide exact pressure loss as information of the control of the blow head. Thus, during switching of the purge situation this information can automatically lead to the corresponding shifting movement in the shifting device.

It is further an advantage when with the overturning device according to the invention the melt inlet and the melt outlet comprise a free flow area which corresponds or mainly corresponds to the free flow area of the melt channel. With other words, a fluid communicating connection between the melt inlet and the melt channel or between the melt outlet and the melt channel is enabled which is continuous without edges or variations in diameter. Such an overturning device can be inserted completely into the melt channel or can even partly configure the melt channel. By a free flow area thereby the cross section perpendicular to the flow of the respective position has to be understood. In other words the free flow area configures the free flow area section via which the volume flow of the molten material can flow.

It is further an advantage when with the overturning device according to the invention the free flow area of the melt guidance means corresponds or mainly corresponds to the free flow area of the melt inlet and/or the free flow area of the melt outlet. Particularly, this embodiment is combined with the embodiment according to the previous paragraph. The flow cross section of the melt guidance means is thereby preferably the amount of all melt guidance means. By this correspondence a constant free flow area is provided such that the pressure loss by narrowing the cross section is avoided or mainly avoided. This significantly reduces the adjusting pressure loss during flow through of the molten material. It remains only or mainly only a pressure loss which is generated by the corresponding influence to the flow direction and therewith by the active rearrangement of the molten material. Thus, for example an extension of the melt channel can ensure such a geometric correlation in the area of the overturning device. Further, it is possible that with division of the separation section a corresponding adjustment of the cross sections is provided by the corresponding cross sections of the separation channel.

Likewise subject matter of the present invention is a blow head for performing a blow head extrusion method. Such a blow head comprises at least a melt channel for conveying molten material to the blow outlet of the blow head. A blow head according to the invention is characterized in that in the at least one melt channel at least an overturning device according to the present invention is assembled. Therewith, a blow head according to the invention provides the same advantages like they are described in detail in relation to the overturning device according to the invention. The melt channel is thereby in a fluid communicating connection with the melt inlet and the melt outlet of the overturning device. Particularly, such a blow head is provided with two or multiple melt channels for different layers of the blow film. The overturning device is preferably assembled in the same or identical configuration in all melt channels in order to provide the same purge time reduction in a manner according to the invention for all melt channels.

A blow head according to the previous paragraph can be further improved in that the overturning device related to the length of the melt channel is assembled in the centre or mainly in the centre of the melt channel. This is an optimized positioning of the overturning device which ensures the maximum reduction of the purge time of about 50%. Naturally, also two or multiple overturning devices are possible which are used preferably with the same or identical separation in the respective melt channel.

With a blow head according to the invention it can be an advantage when a shifting device is provided with at least two overturning devices for a common shifting of the two overturning devices between a first position in which the first overturning device is in a fluid communicating communication with the melt channel and a second position in which the second overturning device is in a fluid communicating communication with the melt channel. This allows taking over in total three different positions with the shifting device. In addition to the standard operation situation in which preferably a melt channel piece allows a corresponding completion of the melt channel, now two positions are possible with the overturning device in use. The single overturning devices differ concerning their rearrangement functionalities such that a different pressure loss or a different geometric influence to the flow proportions in the respective overturning device is specifically achievable. Thus, according to the operation situation in the purge process and particularly depending from the actually used molten material and its viscosity a correspondingly adjusted overturning device can be chosen. Naturally, also more than two overturning devices can be used in this manner. This allows further improving the purge performance via the adjustment and particularly avoiding an undesired overload of the pump device.

It is possible with a blow head according to the invention that with the combination of two or multiple overturning devices one after another each overturning device covers only a part of the respective edge and therewith rearranges only molten material from the edge into the centre in this part. Thereby, preferably each overturning device can perform the rearrangement for another edge section such that after passing of all overturning devices molten material is completely rearranged from the edge into the centre. For example four overturning devices one after another can cover 90° of the extent of the edge with the rearrangement function respectively such that in total the whole extent of 360° is rearranged. A further subject matter of the present invention is a method for performing a purge process in an extrusion device, particularly in a blow head according to the present invention comprising the following steps:

Introducing a molten material into a melt inlet of an overturning device, particularly according to the present invention, Rearranging of molten material from the centre of the melt inlet to the edge of the melt outlet of the overturning device, and Rearranging of molten material from the edge of the melt inlet into the centre of the melt outlet.

A method according to the invention comprises the same functionality according to the invention like the overturning device according to the invention such that the same advantages can be achieved like they are described in detail in relation to the overturning device according to the invention.

A method according to the invention can be further improved in that previous to performing the purge process by a shifting device the overturning device can be shifted into a fluid communicating connection with the melt channel. With other words now the rearrangement functionality can be switched on in that previous to performing the purge process the shifting movement can be performed within the shifting device. Therewith, the switching between the different pressure loss situations can occur according to the situation of use and the purge situation in a cost efficient, simple and effective manner.

Likewise, it can be an advantage when with the method according to the invention subsequently to performing the purge process using a shifting device the overturning device can be shifted into a position without fluid communicating communication with the melt channel. Hereby, this is so to say the switching off of the rearrangement function such that particularly a melt channel piece completes the melt channel instead of the overturning device. Likewise, this allows a cost efficient and simple switching between the rearrangement functionality in the purge situation and the normal situation with the use of the blow head.

Naturally, the blow head according to the invention and/or the corresponding overturning device can be used in other extrusion units, for example in a film extrusion, particularly in a flat film extrusion. Thereby, the blow head can be configured basically as an extrusion head.

Figure 2:
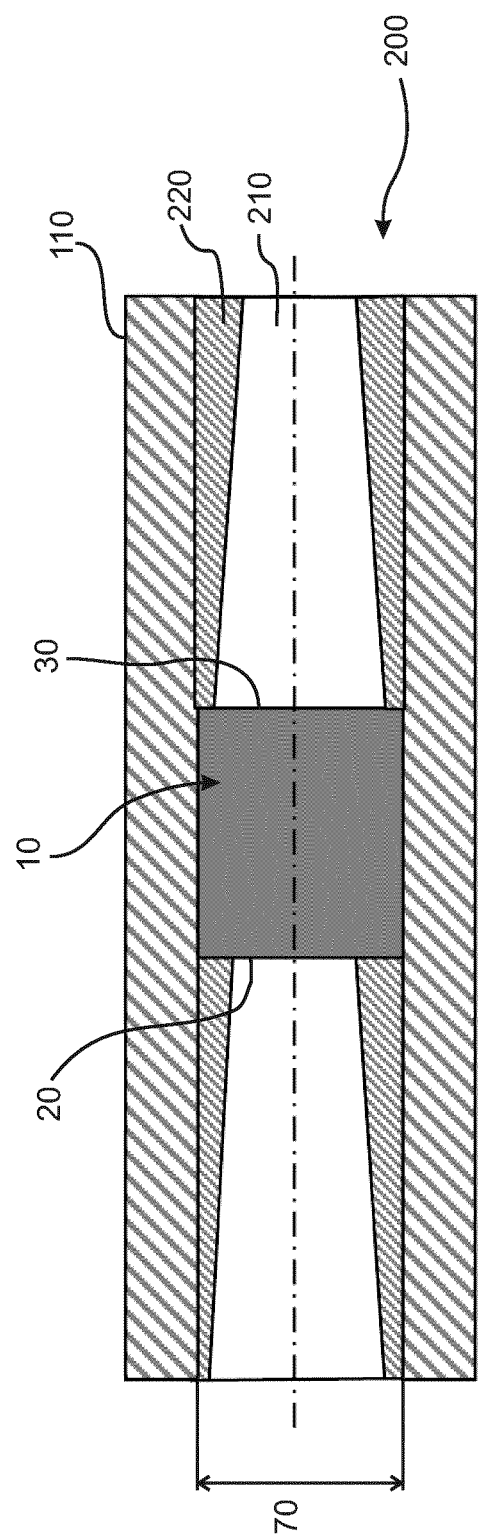
Figure 3:
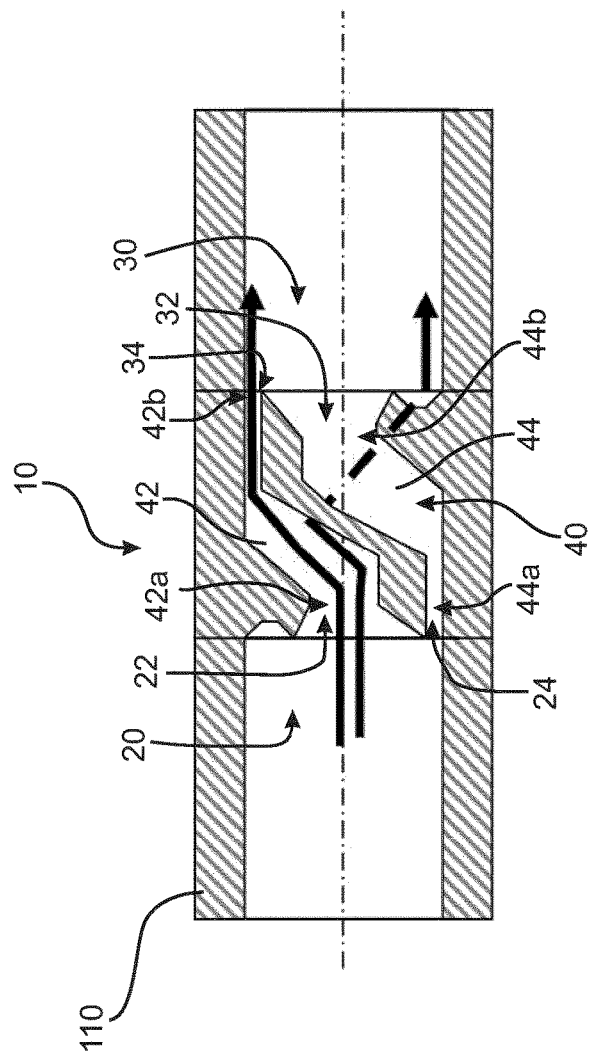
Figure 4:
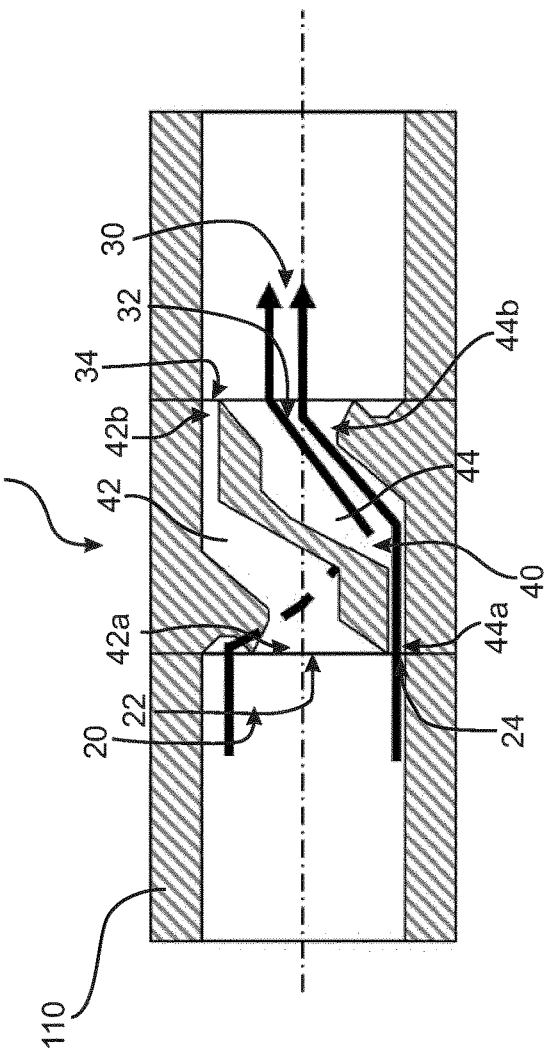
Figure 5:
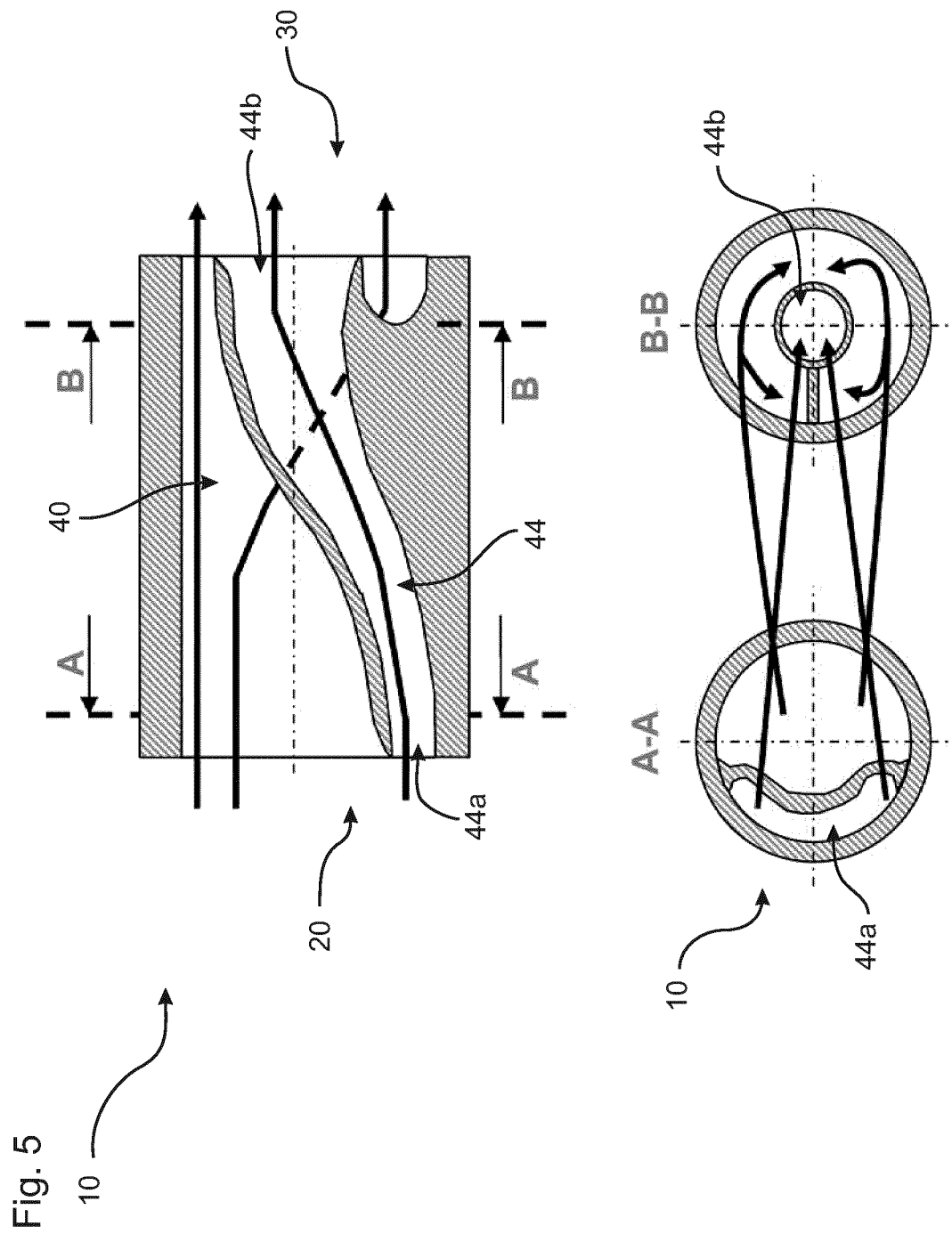
Figure 7:
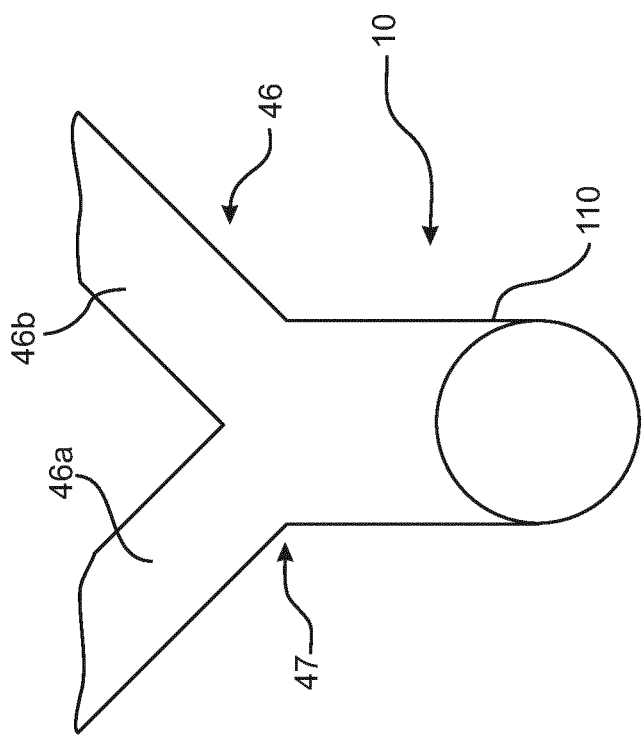
Figure 6:
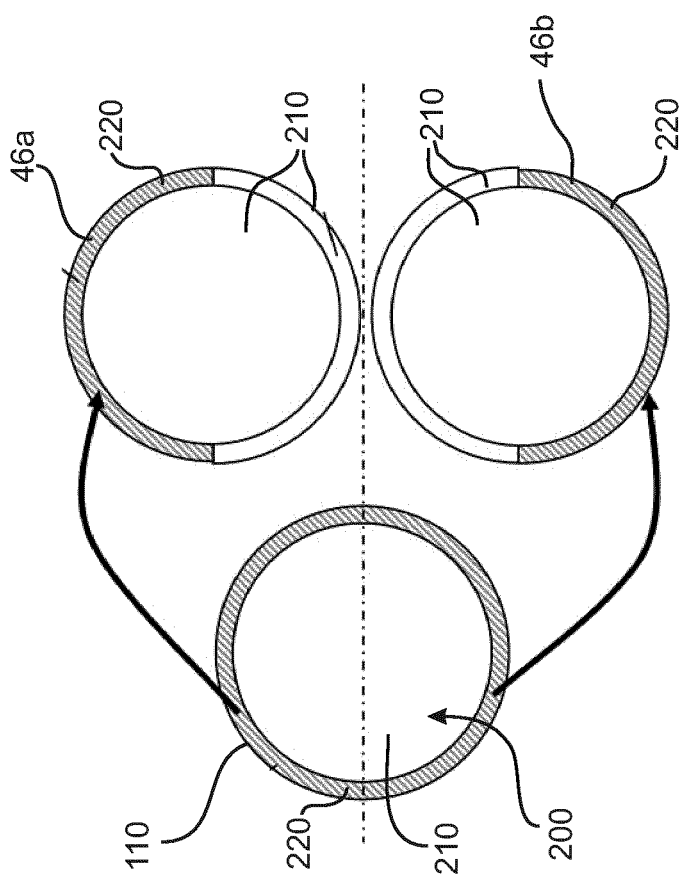
Figure 8:
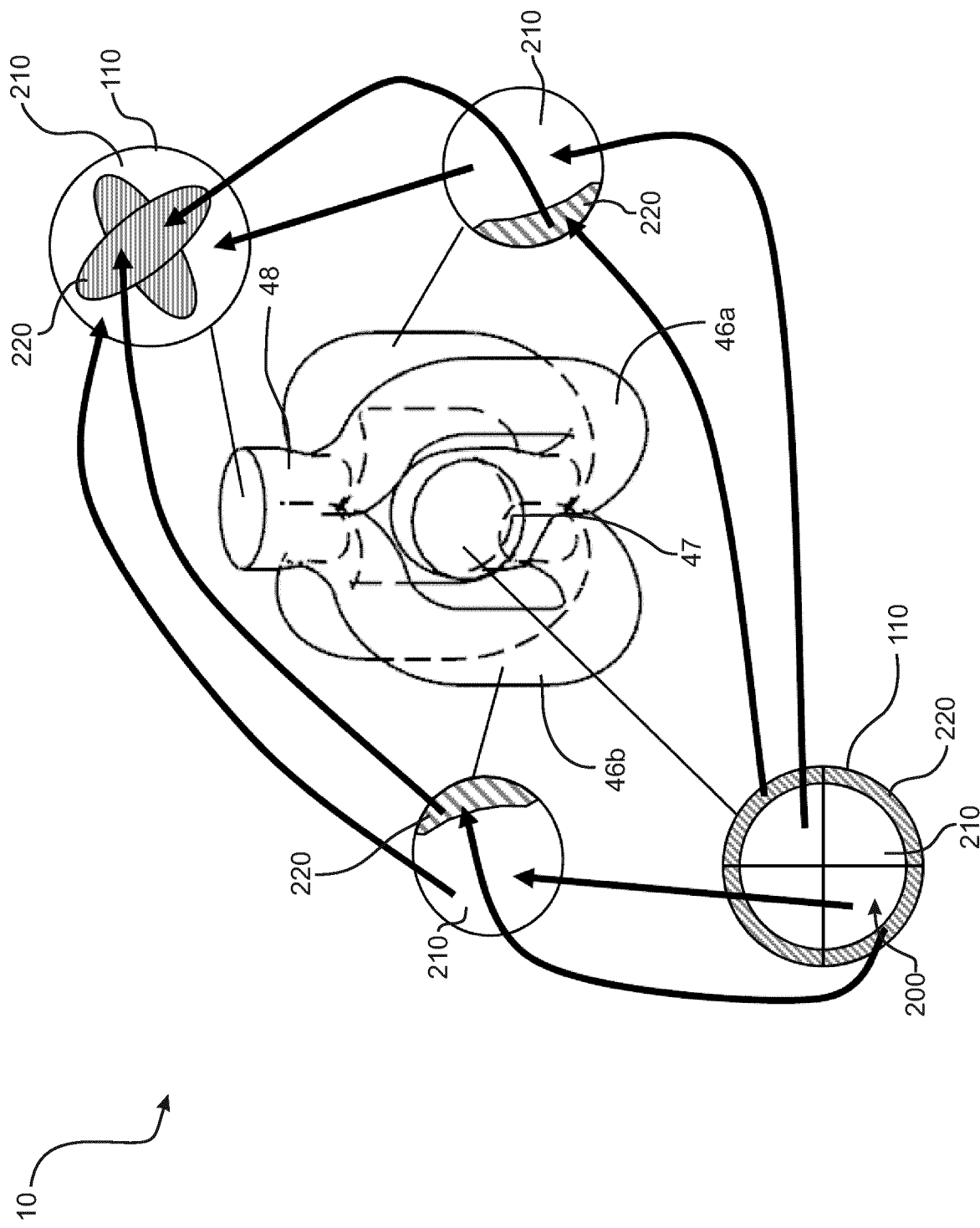
Figure 9:
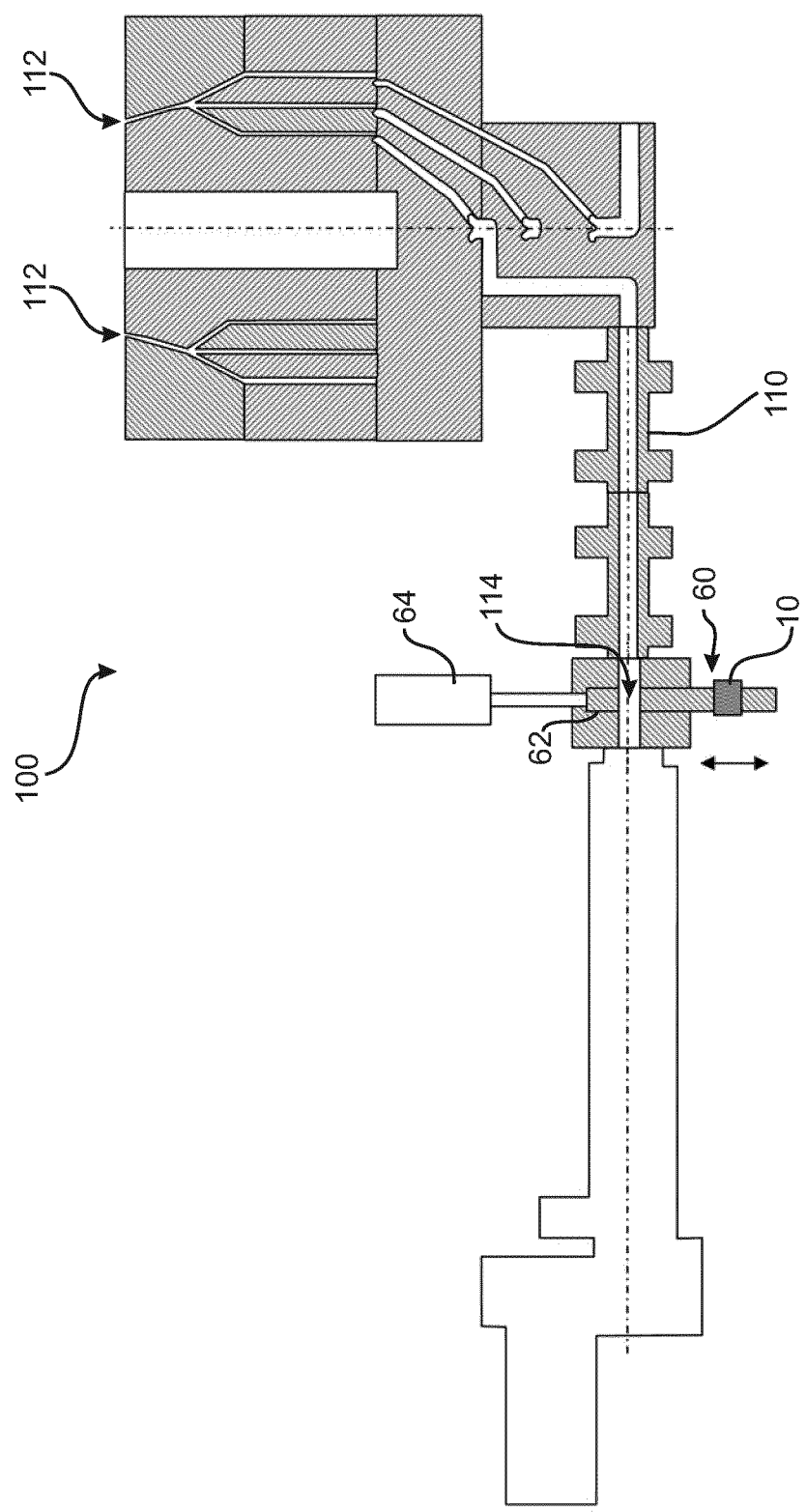
Figure 10:
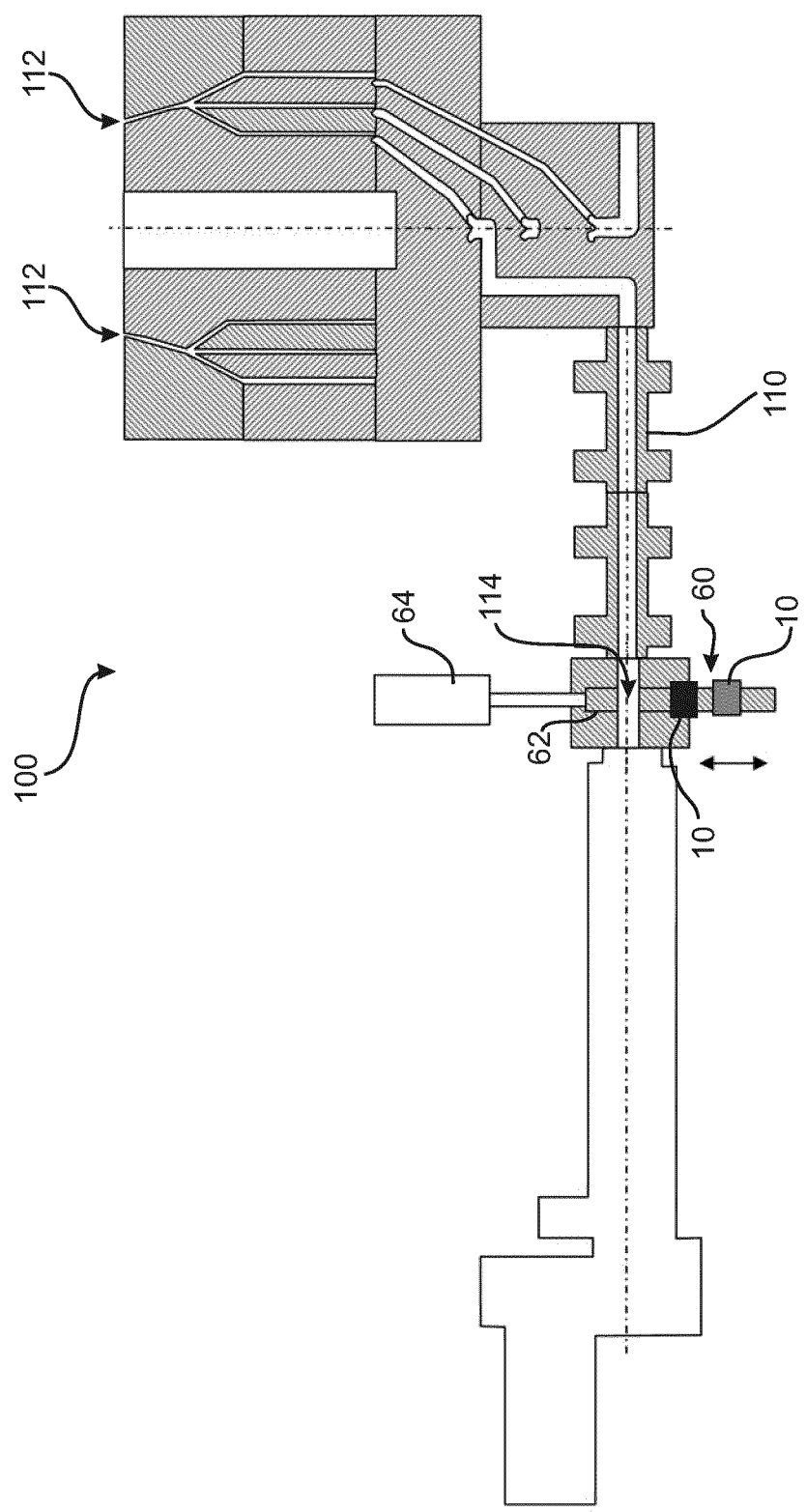

Further advantages, features and details of the invention result from the subsequent description in which embodiments of the invention are described in detail in relation to the drawings. Thereby, the features described in the claims and in the description can be essential for the invention each single for themselves or in any combination. It is shown schematically:

FIG. 1 a schematic representation during a purge process with known extrusion devices, FIG. 2 a situation according to FIG. 1 with the use of an overturning device according to the invention, FIG. 3 an embodiment of an overturning device according to the invention, FIG. 4 the embodiment of FIG. 3 with a further representation of flow conditions of the molten material, FIG. 5 a further embodiment of an overturning device according to the invention, FIG. 6 a schematic representation of the effect of an overturning device according to the invention, FIG. 7 a further embodiment of an overturning device according to the invention, FIG. 8 a further embodiment of an overturning device according to the invention, FIG. 9 an embodiment of a blow head according to the invention, and FIG. 10 a further embodiment of a blow head according to the invention.

In FIG. 1 a melt channel 110 with a flow direction from the left to the right is shown, like it is represented during the purge process. Within the melt channel 110 a free flow area 70 is intended through which molten material 200 flows. Here, it has to be differentiated between the old molten material 220 and new molten material 210. It can be recognized that via the longitudinal course of the melt channel 110 during the purge process a ramp-like or cone-like configuration between the old molten material 220 and the new molten material 210 is configured. This cone moves during the purge time in the course to the right until finally the greatest part of the old molten material 220 is put out and it can be further proceeded with the active production.

In FIG. 2 the mode of action of an overturning device 10 according to the invention is shown. Here, a rearrangement occurs from the edge of the molten material 200 into the centre of the molten material 200 and vice versa. At the melt inlet 20 of the overturning device 10 accordingly material is received from the edge of the molten material 200 and is provided into the centre at the melt outlet 30. In an inverse manner fresh or new molten material 210 is guided from the centre of the melt inlet 20 to the edge of the melt outlet 30. Like it can be recognized, therewith the adjusted amount of the old molten material 220 is reduced at the right edge of the melt channel 110. The representation of FIG. 2 occurs at the same point of time during the purge process like FIG. 1.

FIGS. 3 and 4 show a first embodiment of an overturning device 10 according to the invention. This overturning device 10 is configured with two guidance channels 42 and 44 as melt guidance means 40. By a not further described ring collector a guidance opening 44a is provided at the edge 24 of the melt inlet 20 such that corresponding molten material 200 can flow into the second guidance channel 44. This is shown with arrows in FIG. 4. Via a guidance outlet 44b in the centre 32 of the melt outlet 30 now the rearrangement occurs from the edge into the centre for this molten material 200.

In the same manner in the centre 22 of the melt inlet 20 a guidance opening 42a of the first guidance channel 42 is provided which allows rearranging the molten material 200 at the edge 34 of the melt outlet 30 and the corresponding guidance outlet 42b along the arrows of FIG. 3. Hereby, this is about a technical solution by an active rearrangement, wherein the overturning device 10 is part of the melt channel 110.

FIG. 5 shows a reduced complexity concerning the embodiment of FIGS. 3 and 4. Here, a closed second melt guidance means 40 is intended with the corresponding guidance opening 44a and guidance outlet 44b. The remaining material of the molten material 200 is untouched by the melt inlet 20, guided at the upper edge through the melt guidance means 40 or guided to the lower edge. The corresponding sections A-A and B-B are shown in the lower area of FIG. 5 wherein likewise the arrows represent the corresponding rearrangement movements.

FIGS. 6 and 7 show the possibility to provide a rearrangement by a separation functionality. Starting from a melt channel 110 according to FIG. 7 via a division section 47 a division of the molten material 200 to two separation channels 46a and 46b of the separation section 46 occurs. This schematically leads to a separation according to FIG. 6. Starting from the melt channel 110 completely circumferentially old molten material 220 encloses the new molten material 210 during separation in the separation channels 46a and 46b only approximately half of the extent is covered with old molten material 220. The other half in the separation channels 46a and 46b is already equipped with new molten material 210 at the edge. In case by a clever combining a central merging of both separation channels 46 for the edge areas is performed with old molten material 220, thus a complete or at least partial rearrangement according to the invention occurs by this separation function.

FIG. 8 schematically shows a possible further embodiment of an overturning device 10 with this separation functionality. Here, a division to in total four separation channels 46a and 46b and a recombining in a combination section 48 occurs. Schematically, further a corresponding distribution of old molten material 220 and new molten material 210 is shown in the corresponding channels. After combining or merging at the combination section 48 the edge sections with the old molten material 220 are completely in the centre such that the surrounding edge in the melt channel 110 is configured mainly completely with new molten material 210.

In FIG. 9 it is shown how in a melt channel 110 in a blow head 100 an overturning device 10 can be assembled. Thereby, here it can be the described embodiment of the overturning device 10. Thereby, the overturning device 10 comprises a shifting device 60. According to FIG. 9 the overturning device 10 is in the second position and therewith outside a fluid communicating engagement with the melt channel 110. Hereby, this is the operation position. For the purge situation the overturning device 10 is inserted into the melt channel 10 via the shifting device 60 and therewith can provide the functionality according to the invention for the reduction of the purge time. For the movement of the shifting a drive device 64 is intended which comprises an electric motor. The shifting occurs along a straight line and is guided through a guidance section 62 of the shifting device 62. Further, in the shifting device 60 a melt channel piece 114 is intended which completes the melt channel 110 in the second position according to FIG. 9. The blow head of this embodiment is configured with a ring-like blow outlet 112.

In FIG. 10 a variation of the embodiment of FIG. 9 for a blow head 100 is shown. Here, the shifting device is configured with two separate and especially different overturning devices 10. Thus, here the shifting device can take over three different positions. Besides the operation function in FIG. 10 two different purge positions with the different overturning devices can be taken over such that an adjustment to the different requirements can occur during the purge process.

The previous description of the embodiments describes the present invention only within the scope of examples. Naturally, single features of the embodiments as far as technically meaningful can be freely combined with one another without leaving the scope of the present invention.

LIST OF REFERENCE SIGNS

10 Overturning device
10 Melt inlet
22 Centre of melt inlet
24 Edge of melt inlet
30 Melt outlet
32 Centre of melt outlet
34 Edge of melt outlet
40 Melt guidance means
42 First guidance channel
42a Guidance opening
42b Guidance outlet
44 Second guidance channel
44a Guidance opening
44b Guidance outlet
46 Separation section
46a First separation channel
46b Second separation channel
47 Division section 48 Combination section
60 Shifting device
62 Guidance section
64 Drive device
70 Free flow area
100 Blow head
110 Melt channel
112 Blow outlet
114 Melt channel piece
200 Molten material
210 New molten material
220 Old molten material

The invention claimed is:

1. A system comprising:
an overturning device for overturning a molten material in a melt channel, the overturning device comprising:
   a melt inlet,
   a melt outlet, and
   a melt guidance piece having an outer surface that in conjunction with an inner surface or outer surface of the melt channel forming a first guidance channel and a second guidance channel, the first guidance channel configured to rearrange molten material from the centre of the melt inlet to the edge of the melt outlet, and the second guidance channel configured to rearrange molten material from the edge of the melt inlet into the centre of the melt outlet; and
a shifting device configured to move the overturning device between a first position in which the melt inlet and the melt outlet of the overturning device are in a fluid communicating connection with the melt channel and a second position in which the melt inlet and the melt outlet are separated from the melt channel.

2. The system according to claim 1, wherein the overturning device comprises a separation section with a first separation channel and a second separation channel, wherein in front of the separation section a division section for dividing the molten material to the separation channels and at least after the separation section a combination section for merging the molten material from the separation channels is assembled or the combination section is configured for a central merging of the edge sections of the molten material.

3. The system according to claim 1, wherein the shifting device comprises a melt channel piece with a length which corresponds to the distance between the melt inlet and the melt outlet.

4. The system according to claim 1, wherein the shifting device comprises a guidance section for guiding the movement of the overturning device between the first position and the second position.

5. The system according to claim 1, wherein the shifting device is configured to move the overturning device between the first position and the second position along a translational path.

6. The system according to claim 1, wherein the shifting device comprises a drive device for performing the shifting between the first position and the second position.

7. The system according to claim 5, wherein the translational path is a straight line.

8. The system according to claim 6, wherein the shifting device comprises a drive device in form of an electric motor for performing the shifting between the first position and the second.

* * * * *